No. 624,193. Patented May 2, 1899.
C. W. DIETRICH.
PIPE FITTING.
(Application filed Oct. 9, 1896. Renewed Feb. 6, 1899.)

(No Model.)

Witnesses:
John W. Adams
Robt D. Carter

Inventor:
Charles W. Dietrich,
by Parkinson, Carter & Graver,
Attorneys.

UNITED STATES PATENT OFFICE.

CHARLES W. DIETRICH, OF CHICAGO, ILLINOIS.

PIPE-FITTING.

SPECIFICATION forming part of Letters Patent No. 624,193, dated May 2, 1899.

Application filed October 9, 1896. Renewed February 6, 1899. Serial No. 704,736. (No model.)

*To all whom it may concern:*

Be it known that I, CHARLES W. DIETRICH, of Chicago, in the county of Cook and State of Illinois, have invented certain new and useful Improvements in Pipe-Fittings, of which the following is a specification.

This invention relates to improvements in pipe-fittings, and refers more specifically to a device specially intended for application to prevent or stop leakage of the unions or connecting joints of steam or other pipes which have already been connected up or installed in working plants.

The object of the invention is to provide a simple and convenient packing device which may be applied to the exterior of the pipe without disconnecting the latter from its communicating member and which will serve to effectually prevent any leakage of the union.

The invention consists in the matters hereinafter described, and more particularly pointed out in the appended claims, and may be more readily understood by reference to the accompanying drawings, in which—

Figure 1:
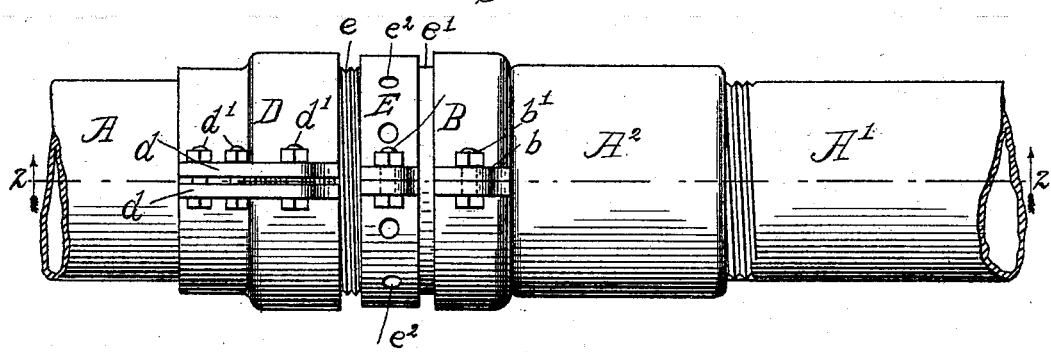
Figure 2:
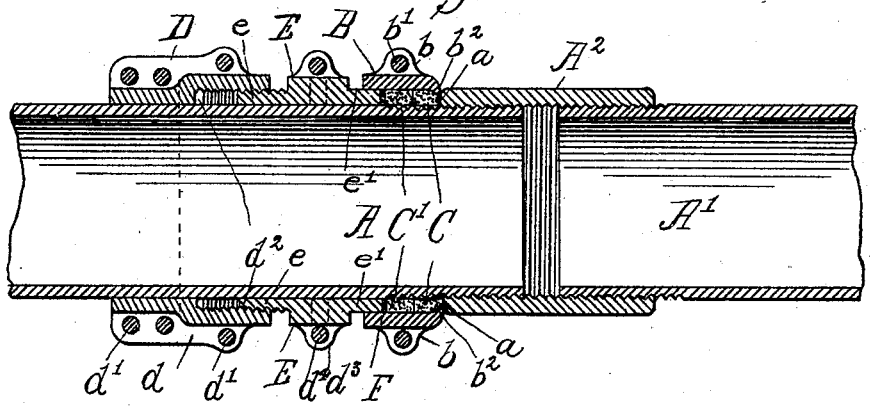

Figure 1 is a plan view of the device shown as applied to an ordinary steam-pipe union. Fig. 2 is an axial sectional view of the same.

Referring to the drawings, A A' designate the meeting ends of two ordinary steam-pipes, and $A^2$ a common union serving to connect said pipes in the usual manner.

B designates a confining-ring conveniently and as herein shown made in two semicircular sections, the ends of which are united by means of external ears $b$, through which are inserted clamping-bolts $b'$. The internal diameter of said ring B is considerably greater than the external diameter of the pipe-section A, upon which it is designed to be placed, so as to afford an annular space between its interior and the outer surface of the pipe A for the reception of one or more packing-rings C C'. The confining-ring B is adapted to be placed immediately adjacent to or against the end $a$ of the union $A^2$, and that end of said confining-ring which rests against the end of the said union is provided with an annular inturned flange $b^2$, which serves to contract the internal diameter of the confining-ring at this point to a diameter but slightly greater than the external diameter of the pipe-section A.

Usually for convenience of application the packing-rings C C' will be cut or divided at one point, so that the ring may be placed upon the pipe without unjointing the latter, and, as shown in the present instance, two such packing-rings are used, which are so arranged that their points of separation break joints. Means for forcibly compressing the said packing-rings within the confining-ring B and against the end of the union $A^2$ are herein shown, constructed and arranged as follows:

D designates a clamping-ring, which for convenience of application is also made in a plurality of sections—in this instance two—united by means of radially-extending webs or ears $d$, through which are inserted clamping-bolts $d'$, the interior diameter of one end portion of said clamping-ring D and the length of its several sections being such that it is adapted to be clamped tightly or rigidly upon the pipe-section A by means of the said clamping-bolts $d'$. The opposite end, or that end toward the union $A^2$, is interiorly enlarged, as at $d^2$, and screw-threaded to receive one end $e$ of a compressing-ring E. The compressing-ring E is likewise composed of a plurality of sections united by webs or ears $d^3$ and bolts $d^4$ in a manner similar to the previously-described rings and is of such diameter as to fit snugly but easily upon the exterior of the pipe-section A, so as to be capable of movement thereon. The forward end $e'$ of the compressing-ring E is constructed to fit easily within the larger end of the confining-ring B and acts as a piston or compressing device to compress the packing-ring sections C C' within said confining-ring when the compressing-ring is screwed forwardly by turning it in the proper direction within the clamping-ring D.

In order to protect the rear side of the rearmost packing-ring C and to lessen the friction between said ring and the end of the compressing-ring, I preferably interpose a metal washer or ring F, which is also conveniently formed in a plurality of sections.

In order to afford means for rotating the compressing-ring E, said ring is conveniently, and as herein shown, provided with a plurality of radially-extending apertures $e^2$, within which may be inserted the ends of a suitable spanner or lever. Obviously, if preferred, lugs may be substituted for the apertures, or the ring-sections may be faceted for the engagement of a wrench.

The operation of the device will be fully understood from the foregoing description and need not be herein further set forth. It will be further obvious that the packing or fitting may be applied with equal efficiency to any joint where the end of the pipe A enters a second communicating member at right angles to the latter—as, for instance, at its entrance to a cylinder-head or the like.

By the foregoing description it will be seen that I have provided a construction which may be applied with the greatest facility to piping which has already been installed and in use either to prevent leakage at the unions or to stop leakage which has resulted from previous use. The device will be found especially valuable for preventing leakage in the joints of relatively large pipes, especially such as are subject to repeated and extreme variations of temperature, it being well understood that such unions are especially troublesome because of leakage.

While I have herein shown what I deem to be a practical and preferred construction, yet it is to be understood that the invention is capable of embodiment in various modifications without departure from the spirit of the invention and without involving more than ordinary mechanical skill. I do not therefore wish to be limited to the details set forth except as made the subject of specific claims; but

What I claim as my invention is—

1. The combination with a union or the like, and an inserted pipe, of a detachable confining-ring of larger diameter than the pipe surrounding the latter at its juncture with the union, an annular packing within the confining-ring, a detachable clamping-ring adapted to be secured to the pipe, and an annular piston having screw-threaded engagement with the clamping-ring and entering the confining-ring to compress the packing therein against the union.

2. The combination with a steam or other pipe, having its end fitted within a second communicating member, of an external packing for said union, comprising a compressible packing-ring arranged to encircle said pipe at its point of entrance within the other member, a confining-ring, composed of a plurality of separable segmental sections, arranged to encircle said packing-ring and provided at its end adjacent to the communicating member with an inturned flange, a compressing-ring also composed of a plurality of separable segmental sections, arranged to fit loosely upon the pipe, constructed to fit at one end within the end of the confining-ring so as to form an annular piston adapted to act upon the packing therein and externally screw-threaded at its opposite end and a clamping-ring composed of a plurality of separable segmental sections adapted to be clamped tightly upon the pipe adjacent to the compressing-ring, said clamping-ring being of enlarged interior diameter at its end adjacent to the compressing-ring and being internally screw-threaded for engagement with the latter.

3. The combination with a steam or other pipe, having its end fitted within a second communicating member, of an external packing for said union, comprising a compressible packing-ring arranged to encircle said pipe at its point of entrance within the other member, a confining-ring, composed of a plurality of separable segmental sections, arranged to encircle said packing-ring and provided at its end adjacent to the communicating member with an inturned flange, a compressing-ring also composed of a plurality of separable segmental sections, arranged to fit loosely upon the pipe, constructed to fit at one end within the end of the confining-ring so as to form an annular piston adapted to act upon the packing therein and externally screw-threaded at its opposite end; a washer interposed between the end of the compressing-ring and packing; and a clamping-ring composed of a plurality of separable segmental sections adapted to be clamped tightly upon the pipe adjacent to the compressing-ring, said clamping-ring being of enlarged interior diameter at its end adjacent to the compressing-ring and being internally screw-threaded for engagement with the latter.

In testimony that I claim the foregoing as my invention I hereunto affix my signature, in presence of two witnesses, this 5th day of October, 1896.

CHARLES W. DIETRICH.

Witnesses:
ALBERT H. GRAVES,
HENRY W. CARTER.